Aug. 3, 1965  G. KIPER  3,198,100
BETWEEN-THE-LENS SHUTTER FOR SINGLE-LENS REFLEX CAMERAS
Filed Oct. 11, 1961
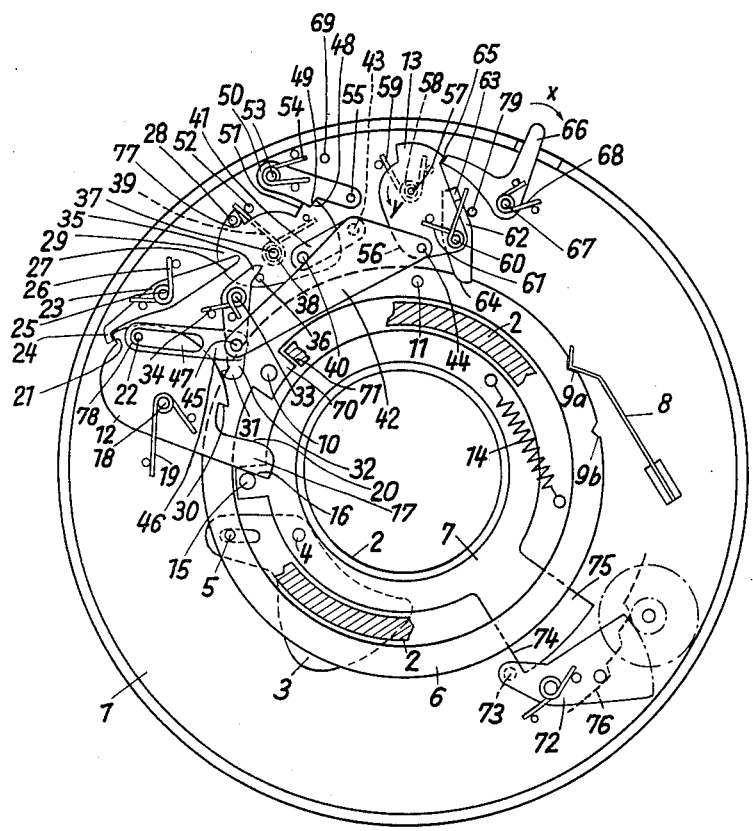
INVENTOR.
GERD KIPER
BY
Michael S. Striker
Attorney

United States Patent Office

3,198,100
Patented Aug. 3, 1965

3,198,100
BETWEEN-THE-LENS SHUTTER FOR SINGLE-LENS REFLEX CAMERAS
Gerd Kiper, Unterhaching near Munich, Germany, assignor to Agfa Aktiengesellschaft, Leverkusen-Bayerwerk, Germany
Filed Oct. 11, 1961, Ser. No. 144,436
Claims priority, application Germany, Oct. 29, 1960, A 35,910
11 Claims. (Cl. 95—63)

The present invention relates to cameras.

More particularly, the present invention relates to shutters. Thus, the present invention relates to shutters of the between-the-lens type which are used in single-lens reflex cameras.

Between-the-lens shutters of single-lens reflex cameras must fulfill a number of special requirements. In the first place, they must of course do what is required of any camera shutter, namely, provide predetermined exposure times. In addition, however, a between-the-lens shutter of a single lens reflex camera must be capable of being fully opened to enable the subject to be viewed through the objective of the camera, and of course just prior to making an exposure it is necessary to completely close the shutter. After this latter closing of the shutter the shutter is opened for the selected time which gives the desired exposure, and then after the exposure has been terminated by closing of the shutter, it is necessary to again fully open the shutter to provide for viewing of the subject for the next exposure. As a result of these requirements, shutters of this type of conventional construction are extremely complex with the result that their cost is high and they easily give rise to defective operation.

It is accordingly a primary object of the present invention to provide a shutter of the above type which is of an exceedingly simple construction, particularly as compared to conventional shutters of this type, which is relatively low in cost, and which is capable of operating reliably over a long period of time during which thousands of exposures are made.

Another object of the present invention is to provide a shutter of this type which is made up of a relatively small number of parts which can be accommodated in a relatively small amount of space within the objective itself so that the size and weight of the objective may be considerably less than conventional objectives of single-lens reflex cameras which include between-the-lens shutters.

A further object of the present invention is to provide a shutter of the above type which will efficiently synchronize the movement of a swing-mirror used to project an image of the subject into the viewfinder with the movement of the shutter so that when the shutter is opened for the purpose of viewing the subject the swing-mirror is in position extending across the optical axis before the shutter is opened for this purpose while when the shutter is opened for making an exposure the swing-mirror has already been located beyond the optical axis so as not to interfere in any way with the proper exposure of the film.

An additional object of the present invention is to provide a structure where an element will perform a multiplicity of functions such as the opening of the shutter to make an exposure as well as the opening and cocking of the shutter to open the shutter for the purpose of viewing the subject.

With these objects in view, the invention includes, in a between-the-lens shutter for single-lens reflex cameras, a support means which forms part of an objective of the camera, and a pair of shutter rings turnably carried by the support means for rotary movement about the optical axis of the objective. These rotary shutter rings are respectively a shutter-opening ring and a shutter-closing ring, and these rings are turnable between a starting position where the shutter is closed and an end position where the shutter is closed. The shutter-opening ring turns in advance of the shutter-closing ring from the starting position to the end position so as to open the shutter, and in accordance with the pre-selected exposure time the shutter-closing ring will follow the shutter-opening ring from the starting position to the end position. In accordance with the present invention a means is provided for moving only the shutter-closing ring from its end position back to its starting position so that the shutter will be opened for the purpose of viewing the subject, and during the entire time that the subject is viewed, just immediately prior to release of the shutter to make an exposure, the shutter-opening ring remains in the end position which it takes after the shutter has run down, while the shutter-closing ring is maintained, in opposition to a spring which moves the shutter-closing ring from its starting toward its end position, in its starting position. Thus, with the invention the shutter includes a pair of rotary rings both of which are turnable in the same direction but at different times for the purpose of providing the exposure, and for the purpose of viewing the subject only one ring is returned to its starting position so as to fully open the shutter to enable the subject to be viewed through the objective itself, as is required in single-lens reflex cameras.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which one possible structure in accordance with the present invention is shown in a plane normal to the optical axis with part of the objective assembly illustrated in section.

Referring to the drawing, there is illustrated therein the shutter housing 1 of the objective of a single-lens reflex camera. This shutter housing includes a outer cylindrical wall and an annular wall which extends in a plane normal to the optical axis and which serves as part of a support means for carrying the structure shown in the drawing. This support means further includes a pair of inner tubes 2 which are coaxial with the outer cylindrical wall of the shutter housing 1 and which have their common axis coinciding with the optical axis, and these rings 2 serve to rotatably support and to center, with respect to the optical axis, a pair of shutter rings 6 and 7, the rings 2 being suitably slotted and formed with suitable cutouts so as to allow the blades 3 of the shutter to move freely between their open and closed positions, and the outer ring 2 is also formed with cutouts so as to provide portions which will act as suitable stops and the like, as will be apparent from the description which follows.

The pair of rotary shutter rings 6 and 7 are thus supported by the support means 1, 2 of the objective for rotary movement about the optical axis, and the ring 6 is a shutter-opening ring while the ring 7 is a shutter-closing ring. The ring 7 carries a plurality of pivot pins 4 which respectively serve to pivotally connect the several shutter blades 3 to the ring 7, while the shutter-opening ring 6 fixedly carries a plurality of pins 5 which respectively extend into elongated slots of the several shutter blades. Only one shutter blade 3 as well as one pin 4 and one pin 5 are shown in the drawing for the sake of clarity. It is apparent that as these rings turn one with respect to the other the shutter will open and close. In the position shown in the drawing the shutter-opening ring is in the end position it reaches after the shutter has run down, while the shutter-closing ring 7 has been returned to its starting position. Both of the rings 6 and 7 have a predetermined starting position where the shutter is closed and a predetermined end position where the shutter is also closed, and, as will be apparent from the description which follows, the shutter opening ring 6 turned in a clockwise direction, as viewed in the drawings, in advance of the shutter-closing ring 7 to the position shows in the drawing in order to open the shutter, and thereafter the shutter ring 7 follows the ring 6 in the same direction to its end position so as to again close the shutter. Prior to the next exposure the shutter ring 7 is returned to its starting position shown in the drawing, while the shutter ring 6 remains in its end position which is also shown in the drawing, and this turning of the ring 7 in a counterclockwise direction, as viewed in the drawing with respect to the ring 6 also serves to open the shutter, so that the shutter is shown in its fully open position in the drawing, and the shutter is maintained in its open position for the purpose of permitting the subject to be viewed through the objective, as is required in single-lens reflex cameras.

A detent means is provided for releasably maintaining the shutter-opening ring 6 in its starting position as well as in its end position, and as may be seen from the drawing this detent means includes the leaf spring 8 fixedly carried at its lower end, as viewed in the drawing, by any suitable stationary bracket or the like, and having its free springy end located in a notch 9a of the shutter-opening ring 6 in the end position thereof shown in the drawing. When the ring 6 is turned in a counterclockwise direction, as viewed in the drawing, back to its starting position, in a manner described below, the second notch 9b of the detent means will reach the springy free end of the spring 8, so that the detent means will also serve to releasably maintain the shutter-opening ring 6 in its starting position.

The shutter-opening ring 6 fixedly carries a pair of pins 10 and 11, the pin 10 being adapted to cooperate with a lever means 12 which acts as a driving lever for moving the shutter-open ring 6 from its starting to its end position, while the pin 11 is adapted to cooperate with a cocking lever means 13 in a manner described below. All of the structures shown in the drawing at the upper left portion as well as above the pair of shutter rings acts as a control means for controlling the shutter in the manner described below, and this structure also acts as a cocking means to cock the shutter and then allow the shutter to be released for making the exposure. The pins 10 and 11 which are fixed to the shutter opening ring 6 respectively extend parallel to the optical axis.

A spring means 14 is connected at one end to a stationary part of the objective and at its opposite end to the shutter-closing ring 7 for urging this ring 7 to turn in a clockwise direction from its starting position shown in the drawing to its end position where the shutter is closed, and this ring 7 fixedly carries a pin 15 which also extends parallel to the optical axis and this pin 15 cooperates with an edge 16 of an arm of a lever means 12 which overlaps both of the rings 6 and 7, as shown in the drawing. This lever means 12 serves as a driving lever for moving the shutter-opening ring 6 from its starting to its end position, as pointed out above, and in addition when the lever 12 is turned by a structure described below in a clockwise direction to the position shown in the drawing the edge 16 of the arm 17 of the lever 12 cooperates with the pin 15 to return the ring 7 in opposition to the spring 14 to the starting position of the shutter-closing ring 7, so that in this starting position of the shutter-closing ring 7 the spring 14 is under tension and is ready to move the ring 7 from its starting position to its end position. The lever means 12 is supported for turning movement by a stationary pin 18 which is fixedly carried by the support means formed by the transverse wall of the housing 1, and a spring 19 is coiled about the pin 18 and engages a stationary pin as well as a pin carried by the lever 12 so that the spring 19 urges the lever 12 to turn in a counterclockwise direction about the pin 18, as viewed in the drawing. It is the force of the spring 19 which is transmitted through the lever 12 and the pin 10 of the ring 6 to the ring 6 in order to turn the shutter-opening ring 6 when an exposure is to be made. For this purpose the arm 17 of the lever 12 has an edge 20 which cooperates with the pin 10, and in addition the lever 12 includes a shoulder 21 and a pin 22 which is carried by the lever 12 for turning movement therewith.

The shoulder 21 of the lever 12 cooperates with the catch portion 24 of a catch lever 23 which is supported for turning movement by the stationary pin 25 which is fixedly carried by the support means, and a spring 26 is coiled about the pin 25 and has a pair of free ends cooperating with a stationary pin and with a pin carried by the catch lever 23 so as to urge the lever 23 to turn in a counterclockwise direction, as viewed in the drawing, so that the catch portion 24 will cooperate with the shoulder 21 to prevent the spring 19 from turning the lever 12 in a counterclockwise direction, in the position of the parts shown in the drawing. The catch lever 23 includes also an arm 27 which is adapted to be engaged by a pin 28 which is carried by a turnable lever 29 which acts as a mirror-controlling lever means to control the position of a swing mirror which, when it extends across the optical axis, serves to project into the viewfinder an image of the subject, as is well known in the art. In the position of the parts shown in the drawing the lever 29 is under tension and when released will turn in a counterclockwise direction, as viewed in the drawing to bring the pin 28 into engagement with the arm 27, as described below.

The lever 12 is also provided with a tooth 30 which is adapted to cooperate with a tooth 31 of a second catch lever 32 so that when the tooth 31 engages the tooth 30 the lever 12 will be prevented from returning to the position shown in the drawing, and this second catch lever 32 is supported for turning movement intermediate its ends by a stationary pin 33 fixedly carried by the support means, and a spring 34 is coiled about the pin 33 and has a pair of free ends respectively engaging a stationary pin and a pin carried by the lever 32 so that the spring 34 urges the lever 32 to turn in a clockwise direction about the pin 33, as viewed in the drawing. This lever 32 has an arm 35 which is engaged by a pin 36 carried by the lever 29 for a purpose described below.

The mirror-controlling lever means 29 is fixed to a pin or rod 37 which is supported for rotary movement by a stationary bearing 38 which is carried by the support means, and a spring 39 is coiled about the bearing 38 and has a pair of free ends respectively engaging a pin carried by the lever 29 as well as a stationary pin 52, so that the spring 39 urges the lever 29 to turn in a counterclockwise direction about the axis of the pin or rod 37, as viewed in the drawing. This pin or rod 37 extends parallel to the optical axis through and beyond the shutter housing and is coupled in a known way to the well known structure which tilts the swing mirror between its position extending at a 45° angle across the optical axis for directing image of the subject up to the viewfinder and its position extending parallel to the optical axis and spaced from the latter so as to permit an exposure to be made. This construction is well known and does not form part of the present invention so that it is not shown in the drawing. It is of course possible to locate the spring 39 out of the shutter housing at the camera side of the shutter housing, if desired, since even if the spring 39 is not located in the shutter housing it can act on the pin or rod 37 so as to urge the lever 29 to turn in a counterclockwise direction, from the position thereof shown in the drawing.

A linkage means is provided to control and synchronize the turning of the levers 29 and 12 in a manner described below, and this linkage means includes a link 41 pivotally connected at 40 to the lever 29, this link 41 being pivotally connected at 43 to a second elongated link 42 of the linkage means, this link 42 being pivotally connected at 44 to a manually turnable lever 13 which forms the third lever means, in addition to the lever means 12 and the lever means 29, and this third lever means 13 is manually operated for the purpose of cocking the shutter in a manner described below, and thus forms a cocking lever means. Besides being pivotally connected at 44 to the lever 13 and through the link 41 to the lever 29, the link 42 of the linkage means is pivotally connected at 35 to a third link 46 which is formed with an elongated slot 47 receiving the pin 22 which is fixedly carried by the lever 12, so that through the pin-and-slot connection 22, 47 the linkage means is also connected with the driving lever means 12.

The lever 29 is formed with a notch 48 which receives a tooth 49 of a catch lever 50 which serves to releasably maintain the lever 29 in the position shown in the drawing, and in addition the lever 29 is formed with a stop edge portion 51 adapted to cooperate with the pin 52 when the lever 29 is turned by the spring 39, so that the engagement of the stop edge 51 with the pin 52 limits the turning of the lever 29 by the spring 39. The catch lever 50 which serves to releasably maintain the lever 29 in the position shown in the drawing is supported for turning movement by stationary pin 53 carried by the support means, and a spring 54 is coiled about the pin 53 and has a pair of free ends respectively engaging the stationary pin and a pin carried by the lever 50, so that this spring 54 urges the lever 50 to turn in a clockwise direction, as viewed in the drawing, and it will be noted that this lever 50 carries at its free end distant from the pivot pin 53 a pin 55 which also is fixed to the lever 50 so as to turn therewith.

When the lever 13 is released in order to initiate the operations which will make an exposure, this lever 13 will turn in a clockwise direction, and the lever 13 has a control edge 56 which engages the pin 55 during turning of the lever 13 in a clockwise direction. This lever 13 is fixed to an elongated pin or rod 57 which extends parallel to the optical axis through and beyond the shutter housing, and the pin 57 is supported for rotary movement about its own axis by a stationary bearing 58 which is carried by the support means. A spring 59 is coiled about the bearing 58 and has a pair of free ends respectively cooperating with a stationary pin and with a pin which is carried by the lever 13 to turn therewith, so that the spring 59 serves to urge the lever 13 to turn in a clockwise direction from the position thereof shown in the drawing. The cocking lever means 13 includes a swing lever portion in the form of a swing lever 62 pivotally connected to the lever 13 by the pin 60 so that while the lever 62 turns with the lever 13 about the axis of the pin or rod 57, this swing lever 62 is at the same time free to turn with respect to the lever 13. A spring 61 is coiled about the pin 60 and engages with one free end a pin which is fixedly carried by the lever 13 and with its other free end a lug 63 which overlaps the right side edge of the lever 13, as viewed in the drawing, so that the spring 61 urges the lever 62 to turn in a counterclockwise direction, as viewed in the drawing, with respect to the lever 13 to the position shown in the drawing where the lug 63 engages the lever 13 so as to limit the turning of the swing lever 62. This swing lever 62 has a control edge 64 which, during turning of the lever 13 in a clockwise direction, as viewed in the drawing, engages the pin 11 of the shutter-opening ring 6. The lever 13 is provided with a shoulder 65 which cooperates with a manually operable release means formed by the lever 66, and it will be seen that a free end of the lever 66 is shown in the drawing engaging the shoulder 65 of the lever 13 to prevent the latter from being turned by the spring 59 in a clockwise direction, this lever 66 extending to the exterior of the shutter housing so as to be accessible to the operator. The lever 66 is supported for turning movement by the stationary pin 67 which is carried by the support means, and the spring 68 is coiled about the pin 67 and engages a pin carried by the lever 66 as well as a stationary pin carried by the support means, so that the spring 68 urges the lever 66 to turn in a counterclockwise direction, as viewed in the drawing, to the position shown in the drawing where the lever 66 presents the lever 13 from being turned by the spring 59.

As has been indicated above, the shutter is shown in the drawing in its cocked position fully open so that the subject can be viewed through the objective. In order to release the shutter so as to make an exposure, the operator turns the release lever 66 in the direction of the arrow $x$. This will of course move the lever 66 away from the shoulder 65 of the lever 13 so that the latter is now released to the force of the spring 59 which proceeds to turn the lever 13 in a clockwise direction, as viewed in the drawing. This turning of the lever 13 will bring the edge 64 of the swing lever 62 into engagement with the pin 11 of the shutter-opening ring 6, and in this way this ring 6 is turned in a counterclockwise direction, as viewed in the drawing, back to its starting position, and when the ring 6 reaches its starting position the notch 9b will have received the end of the spring 8, as pointed out above. The turning of the ring 6 back to its starting position of course results in turning of the shutter blades 3 so as to close the shutter, and of course at this time both of the rings 6 and 7 are in the starting position. When the ring 6 has been returned to its starting position the swing lever 62 moves away from and beyond the pin 11. At this time, which is to say when the ring 6 is in its starting position the pin 10 of the ring 6 is located directly next to the control edge 20 of the arm 17 of the drive lever 12.

The lever 13 of course continues to turn in a clockwise direction beyond the angular position it has at the instant when the swing lever 62 has just moved beyond the pin 11, and during this continued turning of the lever 13 its edge 56 will engage the pin 55 so as to turn the catch lever 50 in opposition to the spring 54 in a counterclockwise direction, as viewed in the drawing, and as a result the lever 29 will be released to the spring 39. The catch lever 50 will be turned in this way by the lever 13 in a counterclockwise direction until the catch lever 50 engages the stationary stop pin 69, and it is this pin 69 which acts through the lever 50 and its pin 55 on the edge 56 of the lever 13 to limit the clockwise turning thereof by the spring 59.

This turning of the lever 13 of course results in movement of the linkage means 41, 42, 46, and during the initial turning of the lever 13 while the swing lever 62 engages the pin 11, the links 41 and 42 will turn with the link 42 moving upwardly over the link 41, and of course the slot 47 can shift readily with respect to the pin 22. It should be noted that the pin 40 which pivotally connects the link 41 to the lever 29 terminates in a plane located at or slightly behind the face of the link 42 which is not visible in the drawing, so that this link 42 can easily slide over and completely cover the link 41. Thus, the fact that the lever 29 is held against turning movement by the catch lever 50 during the initial part of the turning of the lever 13 does not prevent movement of the linkage means in response to turning of the lever 13. When the lever 29 is released as a result of the counterclockwise turning of the catch lever 50, the rod or pin 37 which turns with the lever 29 serves to move in a well known manner the swing mirror upwardly away from the optical axis to the position which this mirror takes during exposure of the film. During this time also, which is to say during the counterclockwise turning of the lever 29, the pin-and-slot connection 22, 47 allows the linkage means 41, 42, 56 to move freely without in any way interfering with the elements 13 and 29. Of course, the lever 13 will have been stopped in the manner described above.

As the lever 29 approaches the end of its turning movement, and it should be noted that the lever 29 turns as a result of the action of the spring 39 in a counterclockwise direction, as viewed in the drawing, the pin 28 will reach the arm 27 of the catch lever 23 to turn this lever in opposition to the spring 26 in a clockwise direction, as viewed in the drawing, so that the catch portion 24 will move away from the shoulder 21 of the drive lever 12 and thus release the drive lever 12 to the force of the spring 19. Of course, when this happens the swing mirror has already been turned upwardly to the position which it takes for exposure of the film. As was pointed out above, the lever 29 will continue to turn until its stop edge 51 engages the stationary pin 52.

The drive lever 12 is now released so as to be turned by the spring means 19 in a counterclockwise direction, as viewed in the drawing, and thus its control edge 29 will, by engagement with the pin 10, move the shutter-opening ring 6 from its starting position in a clockwise direction to its end position where the projection 70 of the ring 6 engages the stop edge 71 formed by a cutout portion of the outer supporting tube 2. The shutter-opening ring 6 turns at this time from its starting position in advance of the shutter-closing ring 7, so that the parts will again assume the position indicated in the drawing and of course the shutter is now fully open so that an exposure will be made.

Of course, the control edge 16 of the arm 17 of the drive lever 12 moves away from the pin 15 so that the spring 14 can now turn the shutter-closing ring 7 in a clockwise direction from its starting position toward its end position, but a retarding means shown at the lower right end portion of the drawing acts in a well known manner to retard the turning of the shutter-closing ring 7 by the spring 14 so as to provide a preselected exposure time. The retarding mechanism includes the pivotally mounted gear sector 72 which carries a pin 73 adapted to be engaged by the edge 74 of a projection 75 of the shutter-closing ring 7. This lever or gear sector 72 includes a pin which engages a stepped camming edge 76, and in a manner well known in the art the operator, when setting the exposure time, places a selected step in engagement with the pin of the sector 72 so as to control the exposure time in this way. When the drive lever 12 has turned through a given distance in a counterclockwise direction under the influence of the spring 19, this distance of course being sufficient to locate the shutter-opening ring 6 in its end position shown in the drawing, the tooth 30 of the lever 12 will have moved sufficiently to be engaged by the tooth 31 of the catch lever 32 which is urged to turn by the spring 34 in that direction which places the tooth 31 in engagement with the tooth 30, and thus in this way the catch lever 32 serves to prevent, temporarily, the lever 12 from returning to the position shown in the drawing. It will be noted that with the lever 29 turned by the spring 39 in a counterclockwise direction from the position shown in the drawing, the pin 36 moves away from the arm 35 of the catch lever 32 so that this catch lever can freely turn in a clockwise direction to have its tooth 31 engage the tooth 30 of the lever 12.

In the manner descibed above an exposure is made and the shutter has run down, both of the shutter rings being at this time in their end position where the shutter is again closed. In order to cock the shutter an unillustrated structure which is well known in the art cooperates with the rod 57 so as to turn this rod and the lever 13 therewith in the direction of the arrow y shown in the drawing, and thus the cocking lever 13 will start to be manually returned toward its cocked position shown in the drawing. The lever 12 is at this time of course held against turning in a clockwise direction by the catch lever 32. As a result, during the initial turing of the cocking lever 13 the linkage means 41, 42 will act only on the lever 29 to turn this lever in opposition to the spring 39 in a clockwise direction, and this movement will continue until the stop edge 77 of the lever 29 engages the free end of the spring 39 which engages the stop pin 52, so that in this way the turning movement of the mirror-controlling lever 29 in a clockwise direction during cocking of the shutter is limited. Of course, this turning of the lever 29 in a clockwise direction will result in return of the mirror to its position extending across the optical axis so that when the shutter is thereafter opened, in a manner described below, the subject will again be capable of having its image projected from the objective by this mirror up to the viewfinder, as is well known in the art. Thus, it will be seen that the swing-mirror is returned to its position extending across the optical axis while the shutter blades 3 are in their closed position.

This mirror is returned to its position extending across the optical axis during the initial part of the turning movement of the lever 29, and during the continued movement of the lever 29 the linkage means will have reached the position where the left end of the slot 47, as viewed in the drawing, engages the pin 22 so that the continued turning movement of the cocking lever 13 will now result, through the linkage means, in turning of the driving lever 12 in opposition to the spring 19 in a clockwise direction. The pin 36 carried by the lever 29 engages the arm 35 of the catch lever 32 just before the end of the slot 47 reaches the pin 22, and in fact just before the notch 48 reaches the tooth 49 of the catch lever 50, so that when the left end 78 of the slot 47 reaches the pin 22 the catch lever 32 will have been turned so as to displace its tooth 31 from the tooth 30 and shortly thereafter the notch 48 will reach the tooth 49 of the catch lever 50 so that the lever 29 will now again have been returned to the position shown in the drawing. Of course, when the lever 13 was initially turned through the manual turning of the rod 57 in the direction of the arrow y, its edge 56 moved away from the pin 55 so that the spring 54 could now freely urge the catch lever 50 to turn in a clockwise direction, and in this way the spring 54 places the tooth 49 in engagement with the notch 48 to releasably retain the lever 29 in the position shown in the drawing. Of course, at this time the pin 36 will have turned the lever 32 to the position shown in the drawing in opposition to the spring 34.

Thus, the linkage means can now act on the lever 12 to turn the latter in opposition to the spring 19 in a clockwise direction back toward the position shown in the drawing, and the control edge 16 of the lever 12 at this time cooperates with the pin 15 to return the shutter-closing ring 7 to its starting position in opposition to the spring 14 so as to open the shutter and again place it in the position shown in the drawing to enable the subject to be viewed.

At the end of the cocking operation the projection 24 of the catch lever 23 is moved by the spring 26 over the shoulder 21, so that the drive lever means 12 is now retained by the catch lever 23 in opposition to the spring 19 in the position indicated in the drawing. Thus, release of the lever 12 is now prevented until movement of the lever 23 by the pin 28 in the manner described above.

Of course, at the end of the turning movement of the cocking lever means 13 in the direction of the arrow y, the shoulder 65 of the lever 13 moves beyond the free end of the lever 66 so that this lever can be turned by the spring 68 back to the position shown in the drawing preventing turning of the lever 13 by the spring 59 until the lever 66 is manually turned in the direction of the arrow x, and it will be noted that at this time the spring lever 62 is located closely adjacent to the stop pin 79 which is fixedly carried by the support means and which also serves to limit the turning movement of the lever 13 by the manually turnable rod 57 which is fixed to the lever 13.

Of course, during the return of the lever 13 to the position shown in the drewing the swing lever 62 will again engage the pin 11, but at this time the pin 11 will simply turn the swing lever 62 in opposition to the spring acting thereon in a direction which moves the lug 63 away from the side edge of the lever 13 until the swing lever 62 again moves beyond the pin 11, and now the swing lever 62 will be automatically returned by the spring acting on the same to the position shown in the drawing.

Thus, the parts have again been returned to the position shown in the drawing where the shutter is cocked, and it will be noted that in this position the shutter is also fully open so that the subject can be viewed.

Thus, in accordance with the present invention, the provision of a pair of turnable shutter rings enables the structure to be considerably simplified since the shutter-opening ring 6 is allowed, in accordance with the invention, to remain in the position it takes when the shutter has run down while only the shutter-closing ring 7 is returned to its starting position in opposition to the spring 14 in order to provide a fully open shutter to which the subject may be viewed, and in this way the movement of the shutter rings for controlling the opening and closing of the shutter is considerably simplified, and in fact all of the structure is considerably simplified as compared to conventional structures of this type.

It will be understood that each of the elements described above, or two or more together, may also find a useful application in other types of shutters differing from the types described above.

While the invention has been illustrated and described as embodied in between-the-lens shutters for single-lens reflex cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a between-the-lens shutter for single-lens reflex cameras, in combination, support means forming part of an objective of the camera; a pair of rotary shutter rings carried by said support means for rotary movement about the optical axis of said objective, one of said rings being a shutter-opening ring which opens the shutter when said shutter-opening ring turns in a predetermined direction about the optical axis relative to the other of said rings, and said other ring being a shutter-closing ring which closes the shutter when said shutter-closing ring turns in said predetermined direction relative to said shutter-opening ring; spring means cooperating with said shutter-closing ring for urging the latter to turn in said predetermined direction when said spring means is tensioned; and shutter-cocking means cooperating with said shutter-closing ring for turning the latter in opposition to said spring means in a direction opposite to said predetermined direction to a position opening the shutter while said shutter-opening ring remains in the position it takes when the shutter has run down and is closed, so that when the shutter is cocked by said shutter-cocking means the shutter will be fully open so that the subject may be viewed through the shutter preparatory to making an exposure.

2. In a between-the-lens shutter for single-lens reflex cameras, in combination, support means forming part of an objective of the camera; a pair of rotary shutter rings carried by said support means for rotary movement about the optical axis of said objective, one of said rings being a shutter-opening ring which when it turns in a predetermined direction from a given starting position of both of said rings where the shutter is closed will open the shutter when said shutter-opening ring turns in said predetermined direction relative to the other of said rings while the latter remains in said starting position, and said other ring being a shutter-closing ring which closes the shutter when it turns also in said predetermined direction after said shutter-opening ring from said starting position while said shutter-opening ring remains in a predetermined end position; spring means cooperating with said shutter-closing ring for urging the same to turn in said predetermined direction from said starting position; lever means carried by said support means and cooperating with said shutter-opening ring when said lever means turns in one direction to move said shutter-opening ring from said starting position in said predetermined direction to said predetermined end position so that when said lever means turns in said one direction the shutter will be opened, said lever means when it turns in a direction opposite to said one direction returning said shutter-closing ring to said starting position in opposition to said spring means while said shutter-opening ring remains in said end position so that the shutter will be opened; and manually releasable means cooperating with said lever means for turning the latter in said opposite direction and for releasably holding said lever means in a position where said shutter-closing ring is in said starting position while said shutter-opening ring remains in said end position so that the shutter will be fully opened to enable the subject to be viewed through the objective.

3. In a between-the-lens shutter for single-lens reflex cameras, in combination, support means forming part of an objective of the camera; a pair of rotary shutter rings turnably carried by said support means for rotary movement about the optical axis of said objective, one of said rings being a shutter-opening ring which when turning from a starting position of both of said rings where the shutter is closed in a predetermined direction will open the shutter while said other of said rings remains in said starting position, and said other ring being a shutter-closing ring which when it turns from said starting position in said predetermined direction after said shutter-opening ring will close the shutter; spring means cooperating with said shutter-closing ring for urging the same to turn from said starting position in said predetermined direction to close the shutter; a pin carried by said shutter-closing ring; and a lever turnably carried by said support means for turning movement in a predetermined direction during cocking of the shutter, said lever having an edge engaging said pin for turning said shutter-closing ring during cocking of the shutter away from said end position toward said starting position in opposition to said spring means while said shutter-opening ring remains in said starting position so that when said lever locates said shutter-closing ring in said starting position thereof said spring means is tensioned and the shutter is fully open so that the subject may be viewed therethrough.

4. In a between-the-lens shutter for single-lens reflex cameras, in combination, support means forming part of an objective of the camera; a pair of rotary shutter rings turnably carried by said support means for rotary movement about the optical axis of said objective, one of said rings being a shutter-opening ring which, when it turns in a predetermined direction from a given starting position of both of said rings, will open the shutter while the other of said rings remains in said starting position, said other ring being a shutter-closing ring which closes the shutter when it turns after said one ring in said predetermined direction, said rings having a predetermined end position when the shutter is closed after said shutter-closing ring follows said shutter-opening ring; spring means cooperating with said shutter-closing ring for urging the same to turn in said predetermined direction from said starting to said end position; a pin carried by said shutter-closing ring; a lever turnably carried by said support means and having an edge engaging said pin, said lever being turnable in a predetermined direction for acting through said pin on said closing shutter ring to turn the latter from said end position toward said starting position in opposition to said spring means while said shutter-opening ring remains in said end position so that when said shutter-closing ring is returned to said starting position the shutter will be fully open so that the subject may be viewed through said objective; and releasable catch means cooperating with said lever for releasably holding the same in the angular position it reaches when said shutter-closing ring has returned to said starting position.

5. In a between-the-lens shutter for a single-lens reflex camera, in combination, support means forming part of an objective of the camera; a pair of rotary shutter rings turnably carried by said support means for rotary movement about the optical axis of said objective, one of said rings being a shutter-opening ring which when turning in a predetermined direction from a given starting position of both of said rings, while the other of said rings remains in said starting position, will open the shutter, and the other of said rings being a shutter-closing ring which when following said shutter-opening ring from said starting position toward said end position will close the shutter; drive lever means cooperating with said shutter-opening ring for turning the same in said predetermined direction from said starting position toward said end position so as to open the shutter, said drive lever means when returning to a predetermined starting position cooperating with said shutter-closing ring for returning only said shutter-closing ring to said starting position thereof while said shutter-opening ring remains in said end position so as to open the shutter to enable the subject to be viewed therethrough; spring means cooperating with said drive lever means for turning the latter in that direction which moves said shutter-opening ring from said starting to said end position thereof; and releasable catch means cooperating with said drive lever means for maintaining the latter in opposition to said spring means in the position where said drive lever means maintains said shutter-closing ring in said starting position thereof.

6. In a between-the-lens shutter for a single-lens reflex camera, in combination, support means forming part of an objective of the camera; a pair of rotary shutter rings turnably carried by said support means for rotary movement about the optical axis of said objective, one of said rings being a shutter-opening ring which when turning in a predetermined direction from a given starting position of both of said rings, while the other of said rings remains in said starting position, will open the shutter, and the other of said rings being a shutter-closing ring which when following said shutter-opening ring from said starting position toward said end position will close the shutter; drive lever means cooperating with said shutter-opening ring for turning the same in said predetermined direction from said starting position toward said end position so as to open the shutter, said drive lever means when returning to a predetermined starting position cooperating with said shutter-closing ring for returning only said shutter-closing ring to said starting position thereof while said shutter-opening ring remains in said end position so as to open the shutter to enable the subject to be viewed therethrough; spring means cooperating with said drive lever means for turning the latter in that direction which moves said shutter-opening ring from said starting to said end position thereof; and releasable catch means cooperating with said drive lever means for maintaining the latter in opposition to said spring means in the position where said drive lever means maintains said shutter-closing ring in said starting position thereof, said drive lever means having an edge portion cooperating with said shutter-opening ring when the latter is in said starting position thereof for turning said shutter-opening ring relative to said shutter-closing ring so as to open the shutter.

7. In a between-the-lens shutter for single-lens reflex cameras, in combination, support means forming part of an objective of the camera; a pair of rotary shutter rings turnably carried by said support means for turning movement about the optical axis, one of said rings being a shutter-opening ring and the other of said rings being a shutter-closing ring, both of said rings having a predetermined starting position where the shutter is closed and a predetermined end position where the shutter is closed and said shutter-opening ring turning from said starting position to said end position in a predetermined direction relative to said shutter-closing ring to open the shutter while said shutter-closing ring turns in the same direction from said starting position to said end position to close the shutter; means cooperating with said shutter-closing ring for maintaining the latter in said starting position thereof while said shutter-opening ring remains in said end position thereof so that it is possible to view the subject through the objective prior to making an exposure; and manually releasable lever means cooperating with said shutter-opening ring for turning the latter back from said end position to said starting position just immediately prior to opening of the shutter to make an exposure, so that both of said rings are at their starting position and the shutter is closed just prior to an exposure.

8. In a between-the-lens shutter for single-lens reflex cameras, in combination, support means forming part of an objective of the camera; a pair of rotary shutter rings turnably carried by said support means for turning movement about the optical axis, one of said rings being a shutter-opening ring and the other of said rings being a shutter-closing ring, both of said rings having a predetermined starting position where the shutter is closed and a predetermined end position where the shutter is closed and said shutter-opening ring turning from said starting position to said end position in a predetermined direction relative to said shutter-closing ring to open the shutter while said shutter-closing ring turns in the same direction from said starting position to said end position to close the shutter; means cooperating with said shutter-closing ring for maintaining the latter in said starting position thereof while said shutter-opening ring remains in said end position thereof so that it is possible to view the subject through the objective prior to making an exposure; and manually releasable lever means cooperating with said shutter-opening ring for turning the latter back from said end position to said starting position just immediately prior to opening of the shutter to make an exposure, so that both of said rings are at their starting position and the shutter is closed just prior to an exposure, said manually releasable lever means including a first rotary lever and a second lever turnably carried by said first lever, said second lever having an edge portion overlapping part of said shutter-opening ring, and the latter ring carrying a pin engaged by said second lever during turning of said lever means so that the latter moves said shutter-opening ring to said starting position thereof.

9. In a between-the-lens shutter for single-lens reflex cameras, in combination, support means forming part of an objective of the camera; a pair of rotary shutter rings turnably carried by said support means for rotary movement about the optical axis, one of said rings being a shutter-opening ring and the other of said rings being a shutter-closing ring, both of said rings having a starting position where the shutter is closed and an end position where the shutter is closed, said shutter-opening ring being turnable from said starting position thereof to said end position thereof while said shutter-closing ring remains in said end position thereof to open the shutter, and said shutter-closing ring being turnable from said starting position thereof to said end position thereof after said shutter-opening ring for closing the shutter; cocking means cooperating with said rings for cocking the shutter, said cocking means comprising lever means carried by said support means and cooperating with said shutter-opening ring when said lever means turns in one direction to move said shutter-opening ring from said starting position to said end position so that when said lever means turns in said one direction the shutter will be opened, said lever means when it turns in a direction opposite to said one direction returning said shutter-closing ring to said starting position, said cocking means maintaining said shutter-closing ring in said starting position thereof while said shutter-opening ring remains in said end position thereof so that the shutter is completely open to enable the subject to be viewed through said objective while the shutter is cocked and is in the completely open position thereof; and manually operable means cooperating with said cocking means for releasably maintaining the latter in the position where the shutter is cocked, so that when said manually releasable means is manually actuated the shutter will be released to make an exposure.

10. In a between-the-lens shutter for single-lens reflex cameras, in combination, support means forming part of an objective of the camera; a pair of rotary shutter rings turnably carried by said support means for rotary movement about the optical axis of said objective, one of said shutter rings being a shutter-opening ring and the other of said rings being a shutter-closing ring, both of said rings having a predetermined starting position where the shutter is closed and a predetermined end position where the shutter is closed and said shutter-opening ring and shutter-closing ring being respectively turnable one after the other from said starting to said end position to first open and then close the shutter; driving lever means turnably carried by said support means and having an elongated arm overlapping both of said rings; and a pair of pins respectively carried by said rings, said arm of said lever means being located between said pins and both of said pins being located closely adjacent to said arm when said rings are in said starting position thereof, said driving lever means being turnable in one direction to engage the pin of said shutter-opening ring to turn the latter to said end position thereof for opening the shutter, whereby said arm of said lever means moves away from said pin of said shutter-closing ring to release the latter for movement to said end position, and said lever means upon returning to the angular position it takes when both of said rings are in said starting position thereof engaging said pin of said shutter-closing ring to turn the latter back to said starting position thereof while said shutter-opening ring remains in said starting position, so that the shutter will be fully opened to permit viewing of the subject through the objective.

11. In a between-the-lens shutter for single-lens reflex cameras, in combination, support means forming part of an objective of the camera; a pair of rotary shutter rings carried by said support means for rotary movement about the optical axis of said objective, one of said rings being a shutter-opening ring which when it turns in a predetermined direction from a given starting position of both of said rings where the shutter is closed will open the shutter when said shutter-opening ring turns in said predetermined direction relative to the other of said rings while the latter remains in said starting position, and said other ring being a shutter-closing ring which closes the shutter when it turns also in said predetermined direction after said shutter-opening ring from said starting position while said shutter-opening ring remains in a predetermined end position; spring means cooperating with said shutter-closing ring for urging the same to turn in said predetermined direction from said starting position; actuating means carried by said support means and cooperating with said shutter-opening ring when said actuating means performs a first movement to move said shutter-opening ring from said starting position to said predetermined end position so that when said actuating means performs said first movement the shutter will be opened, said actuating means arranged to perform a second movement for returning said shutter-closing ring to said starting position in opposition to said spring means while said shutter-opening ring remains in said end position so that the shutter will be opened; and release means cooperating with said actuating means for causing the latter to perform said second movement and for releasably holding said actuating means in a position where said shutter-closing ring is in said starting position while said shutter-opening ring remains in said end position so that the shutter will be fully opened to enable the subject to be viewed through the objective.

References Cited by the Examiner

UNITED STATES PATENTS

| | | | |
|---|---|---|---|
| 2,344,382 | 3/44 | Aiken | 95—63 |
| 2,412,673 | 12/46 | Carroll | 95—63 |
| 2,527,781 | 10/50 | Willcox | 95—63 |
| 2,578,604 | 12/51 | Santoni | 95—63 |
| 2,601,286 | 6/52 | Henry | 95—63 |
| 2,727,445 | 12/55 | Rentschler | 95—63 |
| 2,831,411 | 4/58 | Gebele | 95—63 |
| 2,862,431 | 12/58 | Noack | 95—63 |
| 2,888,866 | 6/59 | Gebele | 95—63 |
| 2,890,640 | 6/59 | Noack | 95—63 |
| 2,900,886 | 8/59 | Gebele | 95—63 |
| 2,926,575 | 3/60 | Gebele | 95—42 |
| 2,943,551 | 7/60 | Gebele | 95—63 |
| 2,971,446 | 2/61 | Noack | 95—63 |
| 3,005,394 | 10/61 | Schulze | 95—63 |
| 3,074,333 | 1/63 | Hahn | 95—42 |

JOHN M. HORAN, *Primary Examiner.*

NORTON ANSHER, *Examiner.*